Oct. 27, 1970     L. P. DORBEC ET AL     3,537,030
GAS LASER DEVICE WITH MEANS FOR INDICATING
OPTIMUM DISCHARGE CONDITIONS
Filed March 11, 1966     3 Sheets-Sheet 1

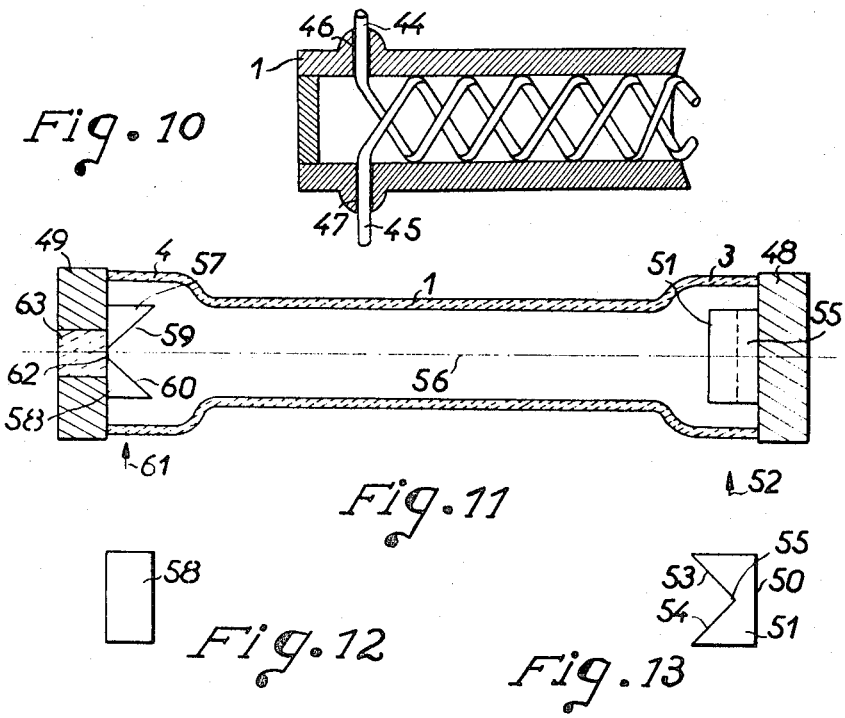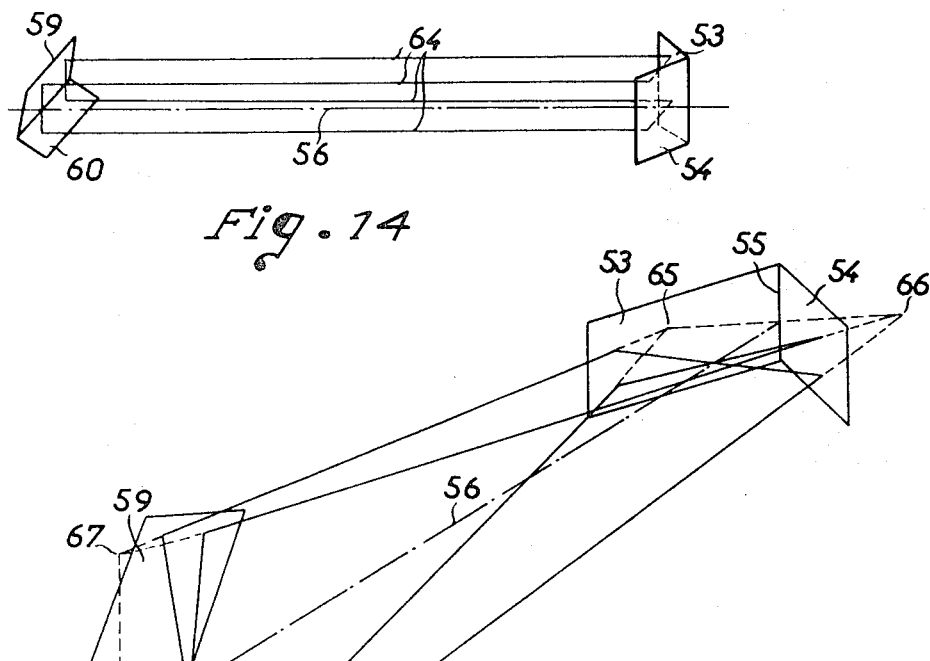

United States Patent Office 3,537,030
Patented Oct. 27, 1970

3,537,030
GAS LASER DEVICE WITH MEANS FOR INDI-
CATING OPTIMUM DISCHARGE CONDITIONS
Lucien Prosper Dorbec, Paris, Alain Philippe Truffert,
Montrouge, and Philippe Jean Vautier, Creil, France,
assignors to Societe Anonyme de Telecommunications,
Paris, France, a French body corporate
Filed Mar. 11, 1966, Ser. No. 533,707
Claims priority, application France, Mar. 24, 1965, 10,465;
July 29, 1965, 26,418; Oct. 19, 1965, 35,365; Nov. 4,
1965, 37,170
Int. Cl. H01s 3/00
U.S. Cl. 331—94.5
14 Claims

ABSTRACT OF THE DISCLOSURE

This invention relates to an infra-red emitting gas laser device, which comprises essentially an elongated, closed tube, placed in a cavity resonator, and containing a gaseous medium with undissociated polyatomic molecules of a gaseous active substance, having at least two vibration-rotation energy levels with invertable populations and an energy gap corresponding to an infra-red wavelength; means are provided for generating, in said gaseous medium, an uninterrupted electric discharge, distributed homogeneously along said elongated tube, but substantially heterogeneously in its cross-section, with heterogeneity zones spaced apart as well from the tube wall as from the tube axial zone.

---

The present invention relates to a laser device for the continuous emission of an infra-red radiation.

Laser devices operating on very different principles are already known, the said devices emitting in continuous wave or even by impulses, radiations of which the wavelengths extend from the hyperfrequency range (maser devices) to those of infra-red and visible radiations. Numerous applications, particularly for telecommunication purposes, are envisaged at the present time for the radiations produced by these laser devices, particularly on account of their coherence and their very high collimation. The laser devices which emit infra-red radiations, due particularly to molecular transitions, are of particular interest for the applications to telecommunications, inasmuch as where certain of these infra-red radiations are transmitted with a low absorption through the earth's atmosphere. For obtaining interesting ranges, these applications to the transmission of data, in particular do however require the production of infra-red radiations of a power which is considerably higher than the power of those which have enabled the laser devices so far developed to be obtained.

The laser device according to the present invention is also based on molecular transitions, but provides the important adavntage over the prior devices of the same type of making it possible to emit a continuous wave infra-red radiation, of which the power can exceed 2 watts, and this with an efficiency which may itself exceed 5%; thanks to these performances, the laser device according to the present invention is thus capable of being used immediately for all applications, particularly for telecommunication purposes, which had hitherto been envisaged, and of which the realisation was dependent on obtaining a sufficient infra-red power with an efficiency of industrial value.

A laser device based particularly on molecular transitions has already been developed, which is formed essentially by an electric discharge tube with a length of about 5 meters inserted in a resonator and filled with pure $CO_2$; this laser device has been capable of emitting, particularly a continuous wave infra-red radiation with a wavelength in the region of $10\mu$ and with a power in the region of 1 mw. It was thus only capable of applications for which very small powers were sufficient, and this consequently excluded the transmission of data with a useful range. Another laser device has also already been developed which is formed essentially by an interaction chamber placed in a resonator and in which a continuous circulation of gaseous $CO_2$ or $N_2O$ was established throughout the emission period, with which gas was mixed a stream of nitrogen, previously excited outside the said interaction chamber by an appropriate electric discharge; this latter arrangement was also able to produce a continuous wave infra-red radiation of a wavelength in the region of $10\mu$ and with a power in the region of 1 mw. with an efficiency of the order of 0.001%. Like the device previously referred to, this laser device was thus incapable of interesting practical applications, particularly for the transmission of data by means of infra-red radiations.

Like certain at least of the prior laser devices which have just been cited, the laser device according to the invention comprises a chamber disposed in a resonator and containing at least one polyatomic emissive gas and also electrodes connected to an electric energy generator and disposed close to the said chamber so as to maintain therein a permanent electric discharge in order to invert therein the populations of certain of the vibration-rotation energy levels of the gaseous molecules. It is of course known that one of the most efficient means known at present for producing an infra-red laser radiation consists in exciting a vibration-rotation energy level of the said gas molecules and not, as in a gas laser device producing for example a visible radiation, in exciting an electronic energy state of the atoms or molecules of the emissive gas; the former excitation can be directly obtained, particularly by the action of an electric discharge within the gaseous medium, which is then formed by the pure emissive gas (for example $CO_2$); the excitation of a vibration-rotation energy level of the molecules of the emissive gas can also be obtained indirectly by resonant collisions between the said molecules (for example of $CO_2$ or $N_2O$) and those of another gas mixed with the first (for example nitrogen), and itself excited beforehand on a vibratory energy level, for example, also by the action of an electric discharge on this latter gas.

According to one important feature of the invention, the gas laser chamber is isolated, at least during the emission, from any source of external gas, so as always to contain the same gaseous mass, substantially at rest, and that the parameters on which depend the electric discharge maintained within the emissive gas itself are adjusted so that the said discharge presents zones of heterogeneity in the vicinity of the electrodes which maintain it.

An important difference between the laser device according to the invention and the prior devices of the same type which have been referred to resides in the fact that the electric discharge is maintained actually within the emissive gas contained in the chamber of the device according to the persent invention, even in the case where this latter is filled with a mixture of gases, for example, $CO_2$ and nitrogen, of which the first must be excited by the second as a result of resonant collisions of their molecules. This difference results obviously in a simplification of the equipment, which only comprises in accordance with the present invention a single chamber in which the two gases are permanently mixed, whereas the prior devices comprised, as well as the interaction chamber in which the two gases were mixed, one or more discharge tubes in which the auxiliary gas was excited before being mixed with the emissive gas.

An even more advantageous difference between the arrangement according to the present invention and the prior devices which have been referred to consists in that the first can emit continuously while remaining isolated from any source of external gas, whereas the prior known devices required complex and fragile means which are essential for establishing in a chamber a continuous circulation of gases, of which the parameters are to be defined with a high degree of precision (gas sources and corresponding re-charging and control members, fluid-tight conduits and members, pumps, pressure gauges, flow meters, arrangements for the automatic control and purification of the gases, etc.). The possibility of operating during a practically indefinite time with the same gas charge without the necessity of renewing or even controlling it (the chamber being then possibly sealed) obviously provides for the laser device according to the present invention an important advantage over the prior devices, particularly as regards the range of application; it is in fact seen that the compulsory measures combined with the necessity of maintaining a continuous gas circulation prevented entirely very many applications for the prior laser devices producing an infra-red radiation.

However, the essential advantage of the laser device according to the invention consists in that it has made it possible to produce, with a still unequalled efficiency, an infra-red radiation which is of a power sufficient to permit immediate application thereof; it has in fact already been indicated that there is truly a "discontinuity" between the levels of power of the prior laser devices of the same type (of the order of a milliwatt) and those of the powers which can be produced by the more developed embodiments of the device according to the invention. This "discontinuity" cannot be absolutely assimilated to a normal step in the course towards the high powers, which characterises all the modern techniques and particularly that of the laser in other words, not any developments within the scope of a person skilled in the art, and possibly suggested to him by the actual standard of his technical knowledge, could multiply the power of the previously mentioned, prior laser devices by a factor appreciably higher than 1000. It has only been possible to achieve such an enormous progress by the introduction of fundamentally new principles into the exploitation of the gas and electric discharge laser devices for the continuous emission of infra-red radiations. The material arrangements employed by the present invention for thus modifying the usual principles as regards the operation of gas and electric discharge lasers consist essentially in the particular nature and distribution of the electric discharge, which is regulated so as to present zones of heterogeneity in the vicinity of the electrodes, as will be hereinafter explained in greater detail. Other improvements permit of increasing still further the power and the efficiency of the laser device according to the present invention; they concern particularly the electrodes which maintain the electric discharge in the chamber.

In one preferred embodiment of the laser device according to the present invention, elongated electrodes in a number which is equal to or is a multiple of that of the phases of the electric energy generator are preferably arranged symmetrically on the side wall of the cylindrical chamber, on which they are closely fitted so as to extend in the axial direction, and the said electrodes are connected to the different phases of the generator, preferably by circular permutation.

This arrangement, and others which will hereinafter be referred to all contribute to varying degrees to increasing the power and the efficiency of the laser device according to the present invention; the combination thereof is however not essential for already obtaining powers of several watts, which powers are far superior to those previously obtained with relatively similar devices. The theory of the complex phenomena, which take a place in the gaseous mass contained in the chamber of the device according to the present invention, is not at present sufficiently understood for it to be possible to indicate the exact role of each of the material improvements claimed in increasing the yeld and the power which is produced; many of these new arrangements which will hereinafter be indicated could appear, if not arbitrary, at least inexplicable for the time being; nevertheless, they all come within the scope of the present invention, inasmuch as they strengthen still further the advantages previously mentioned.

Several embodiments of the laser device according to the present invention will hereinafter be described by way of example and by reference to the accompanying diagrammatic drawings, wherein:

FIGS. 9 and 10 represent diagrammatically two other embodiments of electrodes of the laser device according to the present invention.

FIGS. 11 to 13 illustrate one particular embodiment of the Fabry-Perot resonator with which the laser device according to the present invention is provided.

FIGS. 14 and 15 are intended to explain the operation of the resonator shown in FIGS. 11 to 13.

Figure 1:
FIG. 1 is an elevational view of the chamber of a laser device according to the present invention.

The constructional form of the laser device according to the invention, which is shown in FIGS. 2 to 7 inclusive, comprises essentially a chamber 1, such as that shown in FIG. 1, which is formed by an elongated cylindrical tube, preferably of fused silica, and provided with at least one lateral filling nozzle 2; its end portions 3 and 4 have a diameter slightly greater than that of its middle portion. In the embodiment taken by way of example, the tube 1 has a length of 120 cm. and its middle portion has an external diameter of 30 mm., while its end portions have a diameter of 40 mm. The internal diameter of the tube 1 is in the region of 26 mm. Flat mirrors 7 and 8 are cemented on the optically polished flat end faces 5 and 6 of the tube 1 so as to form a conventional Fabry-Perot resonator. Special precautions which are well-known are taken so that the two flat mirrors 7 and 8 form between them an angle smaller than 10 seconds of arc, that is to say, have a very precise parallel relationship.

In the embodiment under consideration, the tube 1 is filled beforehand, by means of the nozzle 2, with a mixture of $CO_2$, under a partial pressure of 0.7 millibar, atmospheric air under a partial pressure of 1.3 millibars and helium under a partial pressure of 15 millibars; the filling nozzle 2 is then sealed.

Figure 7:
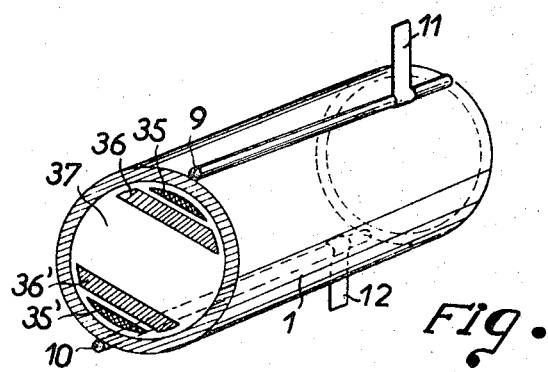
FIG. 7 represents a section of the chamber of the device illustrated in FIG. 2, provided with its two electrodes.

As shown in FIG. 7, two elongated electrodes are arranged symmetrically on the lateral wall of the tube 1, on which they are closely fitted so as to extend in the axial direction; in the embodiment under consideration, each of these two electrodes 9 and 10 is formed by a cylindrical wire of silvered copper, applied to the external face of the cylindrical tube 1 over its entire length along one generatrix so that the two wires 9 and 10 are diametrically opposite one another. Each of the two wires 9 and 10 preferably has a diameter of about 3 mm. and it is soldered to a connection 11 or 12, the purpose of which will be subsequently indicated.

Figure 2:
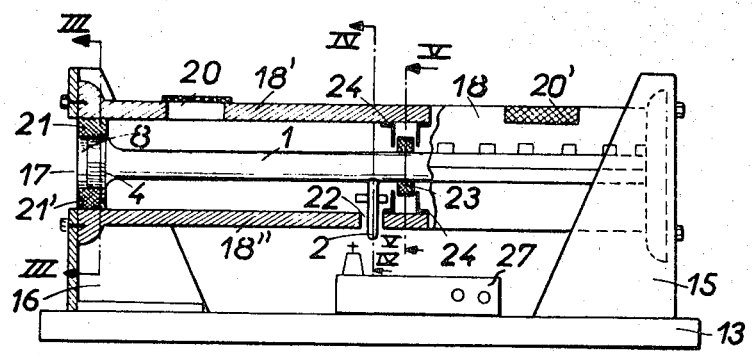
FIG. 2 is an elevational view and a partial section of one embodiment of the laser device according to the invention.
Figure 3:
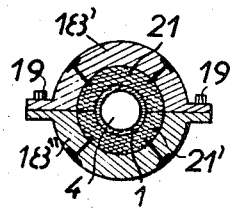
FIGS. 3 to 5 are sections of the chamber and of the envelope of the device illustrated in FIG. 2, the sections being respectively on the lines III—III, IV—IV and V—V.
Figure 4:
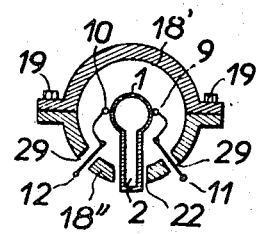
Figure 5:
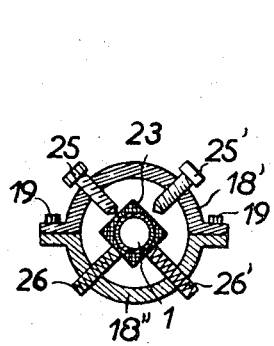
Figure 6:
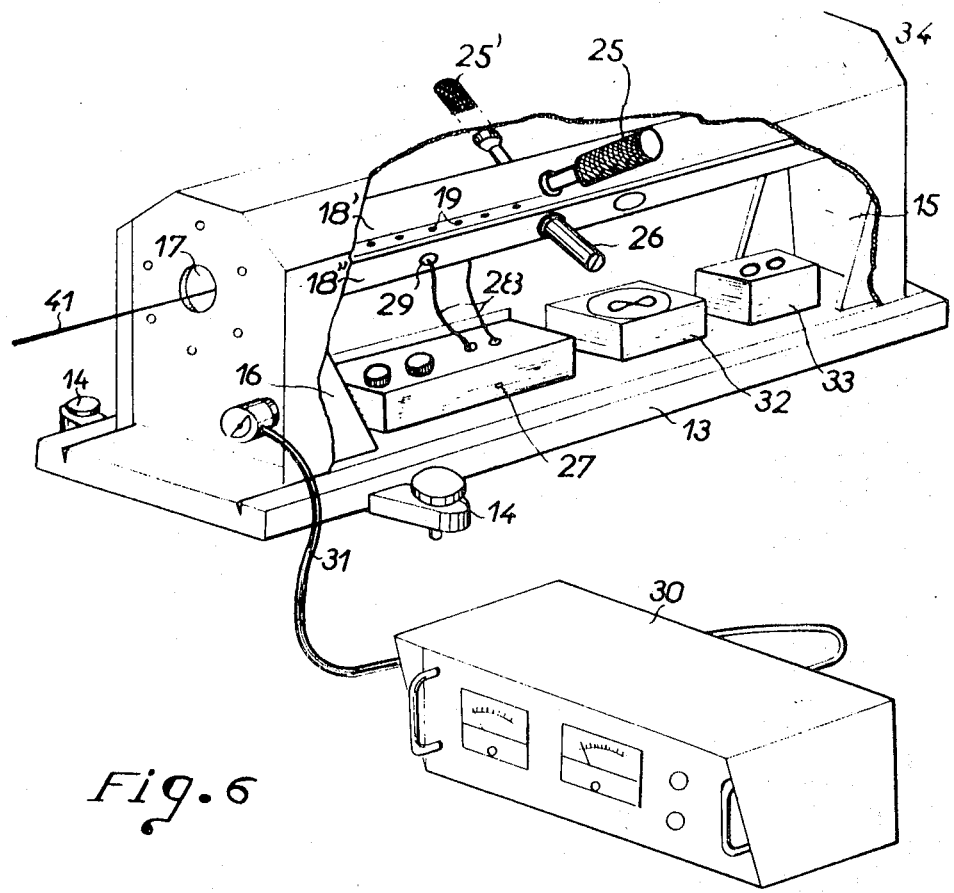
FIG. 6 is a perspective view of the complete installation of the device illustrated in FIG. 2, in which a part of the casing, not shown in the said FIG. 2, has been broken away.

As shown in FIGS. 2 and 6, the laser device assembly is supported by a base plate 13, which itself is supported by means of known anti-vibration devices not shown in FIGS. 2 and 6 by means of screwthreaded feet 14 (see FIG. 6), which permit the horizontal position of the device to be adjusted; the upper face of the base plate 13 carries two right-angled members 15 and 16, of which the second comprises a window 17, the purpose of which will be hereinafter referred to. Bolted on the two members 15 and 16 are respectively the ends of a rigid envelope 18, formed for example by two metal half-shells 18′ and 18″, connected to one another by bolts 19 (see FIGS. 3 to 6). The upper half-shell 18′ is formed with apertures 20, 20′ to assist the discharge of the heat released during operation. The tube 1 is disposed axially of the envelope 18 so that its two ends 3 and 4 of larger diameter are made fast to the corresponding ends of the envelope 18 by means of washers made for example of Teflon, each of the washers being slotted along a diameter and only one of said washers being visible at 21–21′ in FIGS. 2 and 3. The tube 1 is thus mounted in overhung relation inside the envelope 18, its sealed nozzle 2 extending through an opening 22 formed in the lower shell 18″ (see particularly FIG. 4). A square nut 23 consisting for example of Teflon is tightly fitted around the middle portion of the tube 1 near the nozzle 2, the lateral faces of said nut being engaged between guide members 24 fast with the envelope 18 (see FIG. 2). Micrometer screws 25, 25′ extend through the wall of the upper shell 18′ facing two upper flat portions of the nut 23 so that the ends of these screws can co-operate with the said flat portions (FIG. 5); in addition, two sleeves containing return springs 26, 26′ extend through the wall of the lower shell 18″ so as to co-operate with the two lower flat portions of the nut 23.

A high frequency generator 27, producing for example a power which can be adjusted between 50 and 150 watts at 20 mc./s., corresponding to a voltage in the region of 500 volts, peak-to-peak, is arranged on the base plate 13; its output terminals are connected by cables 28 to the connections 11 and 12 of the electrodes 9 and 10 (FIG. 4), through openings 29 formed in the lower shell 18″. The generator 27 is connected to a regulated supply 30 (FIG. 6) by a cable 31. The base plate 13 also carries a fan 32 and its supply device 33 (FIG. 6); the assembly comprising the right-angled members 15, 16, the envelope 18 and also the devices 27, 32 and 33 is enclosed in a housing 34, of which a part is shown broken away in FIG. 6.

As soon as the generator 27 supplies an alternating high frequency voltage to the electrodes 9 and 10 of the tube 1, an electric discharge is set up in the gaseous mixture contained in the said tube. In the case of the previously described device, it is possible to regulate the electric parameters on which this discharge depends in such a way as to give this discharge a heterogeneous distribution, particularly the following heterogeneous distribution, which has been found by experimentation as being the most favourable for the operation of the laser device according to the present invention: this heterogeneous distribution favourable for the electric discharge in the tube 1 is shown by the appearance in the latter of heterogeneity zones localised close to the electrodes 9 and 10, particularly two zones 35 and 35′ (see FIG. 7) which are violet in colour, immediately contiguous with the electrodes 9 and 10 respectively, and two zones 36 and 36′ which are pink in colour and further from the said electrodes, the central zone 37 of the tube 1 remaining colourless. In the case of the previously described device, that is to say, particularly for the given dimensions of the tube 1 and for the indicated values of the partial pressures of the $CO_2$ helium and air filling the said tube, this particularly favourable heterogeneous distribution of the electric discharge in the tube 1 may be obtained by regulating the power of the very high frequency generator to the region of 50 watts, so that an alternating voltage of a value in the region of 500 volts, peak-to-peak (at 20 mc./s., for example), is supplied to the electrodes 9 and 10. On the contrary, if the alternating voltage applied to the electrodes 9 and 10 by the high frequency generator 27 is increased, it is found that the pink-coloured zones 35, 35′, on the one hand, and the violet-coloured zones 36, 36′, on the other hand, increase in size and finally occupy the whole of the tube 1, the electric discharge which is maintained therein thus losing its previously indicated favourable heterogeneous structure.

Figure 8:
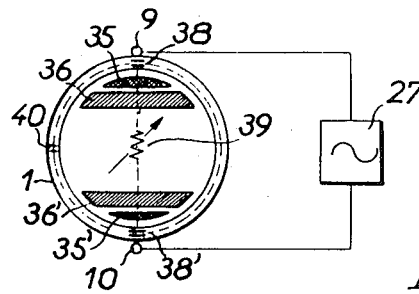
FIG. 8 is an electric diagram intended to explain the maintenance of the electric discharge in the section of the chamber shown in FIG. 7.

FIG. 8 represents the equivalent electric diagram of a section of predetermined length of the tube 1, fed by the high frequency generator 27. It is assumed that the said generator supplies a network formed by the connection in parallel of:

(1) Two elementary capacitances 38, 38′, of which the dielectrics would be formed respectively by the parts of the wall of the tube 1 close to the electrodes 9 and 10, in series with a resistance 39, the value of which experiences a sudden fall with the striking of the electric discharge; for the device previously described, the two capacitances 38 and 38′ in series have a relatively high total value of the order of 100 pf., while the resistance 39 passes from a practically infinite value to about 10KΩ with the starting of the emission;

(2) A capacitance 40, of which the dielectric would be formed by the whole of the wall of the tube 1; in the case of the previously described device, this capacitance 40 has a relatively low value of the order of 16 pf.

Although the capacitance 40 of relatively low value only has substantially for its object to modify the output impedance of the generator 27, the purpose of the high value capacitances 38, 38′ is by no means negligible; it is the presence thereof in particular which necessitates an appropriate choice of the frequency and of the power of the oscillation produced by the generator 27 so that the latter applies to the electrodes 9 and 10 a sufficiently high alternating voltage, more especially of several hundreds of volts, so that a maintained electric discharge is established in the tube 1, the discharge in particular having the heterogeneous distribution which has been described. In actual fact, as the capacitances 38, 38′ form a voltage divider with the resistance 39, so that the useful voltage with a view to producing the electric discharge, that is to say, the voltage at the terminals of 39, is not lower for example than 90% of the voltage produced by the generator 27, it is necessary that the frequency of this latter voltage is greater than 1 mc./s.

The electric discharge maintained by the electrodes 9 and 10 within the gaseous mass contained in the tube 1 causes an excitation of the nitrogen, oxygen and helium molecules on vibratory energy levels and this vibratory energy is transmitted by resonant collisions to the molecules of $CO_2$, which are thus transferred to an upper level of vibration-rotation energy; the result in known manner is an inversion of the populations of this upper energy level and of a lower analogous energy level, on to which certain of the said excited molecules fall back, thus emitting infra-red energy quanta, of which the wave-length corresponds to the interval between the said upper and lower vibration-rotation energy levels and is as a consequence in the range of infra-red radiation, particularly at about $10\mu$. It can be assumed that the excitation of the air molecules has specifically taken place in the heterogeneity zones 35–35′, 36–36′ (FIG. 7) of the electric discharge, the resonant collisions having particularly taken place outside these heterogeneity zones, that is to say, in the central portion 37 of the tube; however, it is only a question here of hypotheses, since at the present time theoretical bases or experimental bases are not available for taking into account in precise manner the mechanisms involved in the gas lasers of this type. In the case where the two mirrors 7 and 8 cemented to the ends of the tube 1 have, by construction, an almost perfect parallelism, and as a consequence form a Fabry-Perot resonator of high quality, the quanta of radiant energy (photons) which are propagated in the axial direction, are reflected by the said mirrors, so that they traverse the tube 1 in its axial direction a very large number of times, this resulting in a multiplication of the said photons by the well-known mechanism of stimulated emission. The mirror 8 cemented to the end 6 of the tube 1 is formed by a transparent material for the infra-red radiation in the region of the 10μ wavelength and its reflecting and for example metallised face is formed, substantially in alignment with the axis of the tube 1, with a narrow window through which a fraction of the infra-red radiation produced by laser effect leaves the said tube, and also leaves its envelope 18 and the housing 34 through the window 17 formed in the member 16 and the said housing 34 in the form of a very narrow beam (41 in FIG. 6). Conventional optical tests have shown that it is not a simple radiation of fluorescence, but is indeed a laser radiation having a very high coherence and parallelism. In the case where the high frequency generator 27 supplies a power of the order of 50 watts, the power of the infra-red laser radiation produced by the previously described device, having been subjected to the adjustments referred to, is already very much higher than that of the previously known laser devices of the same type; this power, and as a consequence the efficiency of the device, can be still further increased with constant power of the generator 27 by improving the parallel relationship of the two mirrors 7 and 8; for this purpose, it is necessary to improve the alignment of the overhung middle portion of the tube 1 with its enclosed end portions 5 and 6; to this end, it is possible elastically to deform the said middle portion of the tube 1 by operating on the micrometer screws 25 and 25', of which the effective directions are perpendicular to one another. The spring boxes 26, 26', respectively, balance the forces exerted on the wall of the tube 1 by the micrometer screws 25, 25'. It is thus possible successfully to produce by means of the device previously described an infra-red radiation with a wavelength in the region of 10μ and of which the power can reach or even exceed 2 watts, and this, under the supply conditions as previously indicated, corresponds to an efficiency of about 5%, very much higher than the efficiencies so far obtained with the laser devices of this type. Such an intense radiation is however only obtained with very precise adjustments of the micrometer screws 25, 25'; actually, by modifying very slightly the relative inclination of the mirrors 7 and 8, which itself is extremely small (of the order of a few seconds of arc), the micrometer screws 25, 25' make it possible to modify the vibratory methods of the Fabry-Perot resonator formed by the said mirrors 7 and 8 and as a consequence the exact value of the wave-length of the emitted radiation. As already confirmed with the prior lasers of the same type, the radiations of very slightly different wave-lengths which can be obtained with the different adjustments of the micrometer screws 25, 25', that is to say, for the different vibratory methods of the Fabry-Perot resonator, have widely dispersed intensities; thus it is that, among the lines Nos. 12 to 30 of the P band of the $CO_2$, which correspond to the transition of the levl of vibratory energy 00°1 of the $CO_2$ molecules to their vibratory energy 10°0, and which it has been possible to obtain with the device previously described, it is the line P (20) corresponding to a wavelength close to 10.59 which give the strongest intensity (radiation power higher than 2 watts). The device described has also made it possible to obtain certain lines of the R band of the $CO_2$ corresponding to the transition referred to, and also lines of the P and R bands corresponding to the transition from the level 00°1 to the level 02°0, also of wave-lengths close to 10μ.

Although the previously indicated working conditions for the laser device according to the present invention and as illustrated in FIGS. 1 to 7 are preferable for enabling it to produce a high power with a best possible efficiency, certain at least of the previously indicated conditions are optional; the values of the adjustment parameters which have been mentioned may in particular vary within fairly wide limits without the power produced by the laser device failing for example below 1 watt. Thus it is possible to modify within a fairly wide range the pressure of the gaseous mass filling the tube 1, particularly by acting on the partial pressure of the $CO_2$ which it contains, it being possible to vary this pressure for example between 0.01 and 1 millibar without the device described ceasing to operate in satisfactory manner. The nature of the gases filling the tube 1 is also subject to option; the $CO_2$ can be replaced more particularly by $N_2O$, the procedure in the production of an infra-red laser radiation then remaining substantially the same as that previously described and permitting the obtaining, according to the adjustment of the resonator, of certain of the lines of the P and R bands of the $N_2O$, of which the wave-lengths are also in the region of 10μ. The gases gases mixed with $CO_2$ or $N_2O$ are preferably nitrogen, oxygen, helium or even, as already indicated above, air. The laser device according to the invention is, however, also capable of operating in circumstances where the tube 1 is filled only with pure $CO_2$ or even pure $N_2O$. In this case, it is the molecules of the $CO_2$ or $N_2O$ which are directly excited by the electric discharge, on the levels of vibration-rotation energy, capable of giving the laser effect.

The characteristics of the high frequency electric energy generator 27 associated with the laser device previously described are also capable of varying within wide limits without appreciable modifications of the advantageous properties of the infra-red radiation which is produced. The frequency of the alternating voltage which it produces can be chosen at will in the range from 10 to 30 mc./s.; its power must be at least equal to several tens of watts and may reach about a hundred watts for obtaining particularly intense infra-red radiations; in all cases, however, the high frequency generator 27 must be able to apply to the electrodes 9 and 10 a voltage of several hundreds of volts, peak-to-peak, essential for maintaining the electric discharge of heterogeneous distribution, which has been described.

The different components of the laser device shown in FIGS. 1 to 7 are also capable of being varied in many ways, these all coming within the scope of the present invention. In particular, the tube 1 may be formed of very different rigid materials; its shape and particularly the shape of its ends 3 and 4 is not at all imperative; the filling nozzle 2, although preferably lateral, is not necessarily at the middle: it can at will be positioned close to one or other of the two ends 3 and 4 of the tube 1; several nozzles can also be provided, particularly in the case where the tube 1 must be filled with a mixture of gases. Because of the high efficiency of the gas laser device according to the present inevntion, its tube may have a length very much shorter than that of the previously developed laser devices of the same type, with an equal power of the infra-red radiations which are produced; thus, one prior arrangement had a tube with a length of 5 meters for producing an infra-red power of the order of mw., whereas a power of the order of W can easily be obtained with a laser device according to the present invention which has a tube much shorter than 1 m. Nevertheless, as with all laser devices, the power of the device according to the present invention is directly proportional to the length of the chamber which encloses the gaseous mass, measured along the axis of the Fabry-Perot resonator. The considerable reduction in the dimensions of the laser device according to the present invention, by comparison with similar prior devices, is further strengthened by the omission of all the accessories which, in the prior devices, were necessary in order to ensure a continuous circulation of gases inside the chamber, these accessories being almost always of dimensions much greater than those of the chamber itself. Thus, it is not only with regard to the infra-red power produced, but also that of its compactness that the laser device according to the present invention repreesnts a true discontinuity in the development curve of the laser devices of the type under consideration.

Figure 16:
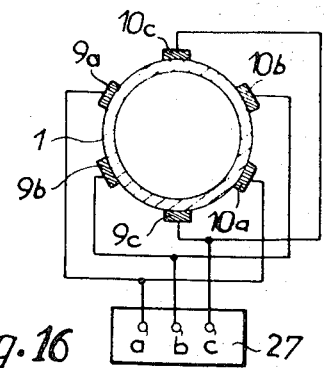
FIG. 16 shows an alternative of the embodiment of FIGS. 7 and 8.

The electrodes with which the tube of the previously described embodiment of the device according to the invention is provided are also capable of numerous variations, all of which come within the scope of the invention. However, it is important, in order to obtain an infrared radiation of high power with a best possible efficiency, for the electrodes intended to maintain the heterogeneous electric discharge in the tube containing the gaseous mass to be of elongated form and to be distributed preferably symmetrically on the wall of the said tube, to which they are closely fitted, so as to extend axially of the tube. Within the scope of these general arrangements, the electrodes of the device according to the present invention can however be developed in many different ways. Thus, in the embodiment shown in FIG. 7, in which each electrode is formed by an elongated cylindrical wire over the entire length of one generatrix of the tube, the diameter of the said cylindrical wire can be caused to vary between 1 and 5 mm. without the result being any substantial modifications in the performances of the laser device according to the invention. The number of electrodes can also be greater than 2; in the case where they are supplied by a single-phase very high frequency electric generator, the number of the electrodes is preferably an even number and they are preferably disposed in pairs symmetrically in relation to the tube axis, the two electrodes of a single pair being thus diametrically opposed and connected to the same terminal of the generator, while two neighbouring electrodes on the lateral wall of the tube are preferably connected to different terminals of the said generator. It is also possible to maintain the electric discharge in the tube containing the gaseous mass by means of a multi-phase very high frequency electric generator; in this case, the tube is preferably provided with electrodes in a number which is a multiple of that of the phases of the generator; these electrodes are also distributed symmetrically on the lateral wall of the tube and they are connected, preferably by circular permutation, to the terminals of the generator corresponding to the diffeernt phases. This is illustrated in FIG. 16, in the case of six electrodes 9a, 9b, 9c; 10a, 10b, 10c, respectively connected to the outputs a, b, c of a three-phase generator 27.

On the other hand, although in the embodiment previously described the electrodes extend over the full length of the tube containing the gaseous mass, particularly in the case where this tube is of considerable length, for example greater than 1 metre, in order to obtain an infrared radiation of very high power, it is possible to divide each of the electrodes extending axially of the tube into several sections which are insulated from one another; in this case, in order to maintain the electric discharge in the tube, several electric generators are employed, the number thereof being equal to that of the sections of each electrode, the outputs of each of these generators being connected respectively to homologue sections of all the electrodes. This arrangement has the advantage of permitting the use of several electric generators of medium power instead of a single generator of very high power for producing the high power which is necessary for maintaining the electric discharge in a tube having a large internal volume.

Figure 9:
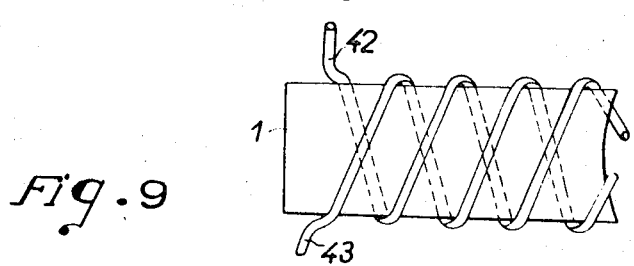

Instead of being formed by cylindrical wires or rods, the electrodes with which the tube of the laser device according to the present invention is provided can be formed by at least one pair of helices with the same winding direction and offset by half a pitch relatively to one another. FIG. 9 shows one of the ends of the tube of a constructional form of the laser device according to the present invention, comprising two helices 42 and 43, each formed by a conductor of circular section and tightly fitted against the lateral wall of the tube 1 externally of the latter. In the case of this constructional form, the zones of heterogeneity of the electric discharge established inside the tube 1 (35–35', and 36–36' in FIG. 7) are disposed helically inside the tube 1 so as to follow the contour of the helical electrodes 42 and 43.

Instead of being formed by conductors having a circular section, the electrodes with which the tube of the laser device according to the present invention is provided can also each be formed by a ribbon of small thickness and uniform width consisting of solid metal, for example, a metal strip deposited by vaporisation or of metal wire braided ribbon, which is also applied tightly against the wall of the tube, either along one of its generatrices or along a helix coaxial with the tube. Such ribbon-like electrodes 9a to 9c and 10a to 10c are illustrated in FIG. 16.

In order to avoid the disadvantages previously mentioned, which are due to the capacitances introduced in series with the electrodes through the wall of the tube (capacitances 38 and 38' in FIG. 8), it is possible to arrange the said electrodes inside the tube; FIG. 10 shows diagrammatically as a section through an axial plane, one of the ends of the tube of one embodiment of the laser device according to the invention, which comprises two helical electrodes 44 and 45 which penetrate inside the tube 1 through air-tight passages 46 and 47 disposed in its lateral wall and are fitted closely to the internal face of the wall of the said tube 1. In this case, the electrodes are formed of or may even be lined with a refractory metal, or even very pure aluminium, so as to be able to resist for a very long period the corrosion due to the impact of ions which are set up in the gaseous mass enclosed in the tube 1 when the heterogeneous electric discharge is maintained therein. Because of the elimination of the capacitances of high value in series with the electrodes, which have been previously mentioned, it is possible to supply the electrodes inside the tube with an alternating electric generator of much lower frequency, or even possibly with a direct current generator. This is very advantageous, since these latter generators cost very much less and are very much more reliable in operation than very high frequency electric generators; on the other hand, the internal electrodes are more costly, since they must be formed of refractory metals and since they necessitate a supplementary glass-making operation.

The envelope 18 of rigid material, in which the tube 1 of the laser device according to the present invention is enclosed at its two ends, is also capable of being constructed in various ways, which differ from one another as regards the nature of the material used for them and also as regards the shape and the dimensions of the said envelope, as well as the shape, the arrangement and the dimensions of the openings with which it is provided. The means provided for adjusting the parallel relationship of the two mirrors 7 and 8 are also capable of being constructed in many different ways, which are also wellknown; in the case where this adjustment in FIGS. 2, 5 and 6 comprises particularly micrometer screws, these screws are also capable of various modifications, differing from one another, for example, by the number, the construction and the arrangement of the micrometer screws and the spring boxes; other equivalent known arrangements can also be used for elastically deforming the central portion of the tube. In one simplified constructional form, the parallel relationship of the flat mirrors 7 and 8 is adjusted once for all, before the laser device is put into operation, by means of an appropriate permanent elastic deformation of the middle portion of the tube by means of fixed wedges, so as to obtain a radiation which is as intense as possible.

Furthermore, the two mirrors between which is inserted the tube containing the gaseous mass of the laser device according to the present invention and which are disposed in such a way as to form a Fabry-Perot resonator, can be made in various known forms. Instead of being flat and parallel, as previously described, these two mirrors can be spherical and possibly confocal; for example, two spherical non-confocal mirrors can be used, of a radius adapted to favour the fundamental vibration method.

In the constructional form of the tube of the laser device according to the present invention, which is shown in FIG. 11, each of the two mirrors of the resonator is formed by two flat reflecting surfaces forming a right dihedron and these two mirrors are disposed in such a way that the corners of their respective dihedrons are disposed perpendicularly of one another and also preferably perpendicularly of the tube axis. What is concerned here is an arrangement which is already known and of which the application to the laser device according to the present invention nevertheless enables the performance thereof to be improved.

As shown in FIGS. 11 to 13, the ends 3 and 4 of the tube 1 are shut off in air-tight manner by glass plates 48 and 49. Cemented on the inner flat face of the glass plate 48 is the flat face 50 of a glass block 51, of which FIG. 13 is a view in the direction of the arrow 52 of FIG. 11. On the side opposite its face 50, this glass block 51 comprises two flat faces 53 and 54 inclined at 45° relatively to its face 50, and as a consequence forming between them a straight dihedron with an edge 55; the block 51 is disposed against the plate 58 in such a way that its edge 55 intersects the axis 56 of the cylindrical tube 1 at a right-angle. These faces 53 and 54 are made reflecting, preferably by metallisation. Cemented on the inner flat face of the glass plate 49 are the small faces of 45° isosceles prisms made of glass and indicated at 57 and 58, the large faces 59 and 60 of these prisms being disposed symmetrically in relation to the axis 56 of the tube 1 so as also to form a right dihedron, of which the edge likewise intersects the axis 56 at a right angle. The two prisms 57 and 58 are fitted against the glass plate 49 so that the edge of their dihedron is perpendicular to the edge 55 of the block 51, that is to say, perpendicular to the plane of FIG. 11 (FIG. 12 is a view of the isosceles prisms in the direction of the arrow 61 in FIG. 11). The two large faces 59 and 60 of the isosceles prisms 57 and 58 are made reflecting, preferably by metallisation. On the other hand, the two prisms 57 and 58 are disposed on the glass plate 49 in such a way that a narrow slot 62 is formed between the contiguous edges of their large faces 59 and 60, this slot being for example a few tenths of a millimetre in width and centred on the axis 56. Furthermore, the glass plate 49 has a recess, for example of cylindrical form, near the extension of the axis 56 of the tube 1, the said recess having embedded therein a piece 63 of a material transparent to the infra-red radiation produced by the laser device according to the present invention, that is to say, of a wave-length close to $10\mu$.

FIG. 14 represents one possible closed path 64 for an infra-red ray being propagated parallel to the axis 56 of the tube 1 of FIG. 11 between the two reflecting dihedrons 53-54 and 59-60. The rays which are reflected by the dihedron 53-54 towards the dihedron 59-60 close to the axis 56 of the tube 1 leave the tube through the slot 62 formed between the two isosceles prisms 57 and 58 and through the piece 63 of material which is transparent to the infra-red radiations; these are the rays which form the useful beam of laser infra-red rays.

In the constructional form which is illustrated in FIGS. 11 to 13, the block 51 and the prisms 57 and 58 are for example formed of borosilicate and their reflecting faces 53, 54, 59, 60 are preferably metallised with gold.

The constructional form of the mirrors of the laser device according to the present invention, which is shown in FIGS. 11 to 13, has essentially the important advantage of not necessitating a precise adjustment of the positions of the said mirrors in order to obtain a very intense laser radiation. This advantage results firstly from the fact that a resonator formed by two reflecting right dihedrons with edges perpendicular to one another has a very high quality factor when it is associated with a gas laser device, even if the axis of the said resonator, that is to say, the perpendicular common to the edges of the two reflecting straight dihedrons, does not coincide perfectly with the axis of the said tube.

Experience has in fact shown that it is sufficient for the axis of the resonator to pass inside the tube without necessarily coinciding with its axis, on which it may even be fairly strongly inclined, without the result being a substantial reduction in the power of the laser device. Secondly, the advantage referred to results from the fact that the quality factor of the resonator formed by two reflecting right dihedrons with edges perpendicular to one another remains very high even if the angles of these two dihedrons are slightly smaller than 90°, for example, by a few minutes of arc. In FIG. 15, in which it is assumed that the dihedron angles of the reflecting flat surfaces 54 and 54 on the one hand and 59 and 60 on the other hand are respectively equal to 90° $\epsilon_1$ and 90° $\epsilon_2$, $\epsilon_1$ and $\epsilon_2$ being angles at most equal to a few minutes of arc, it is shown that, even in this case, closed paths for the privileged rays exist in the resonator formed in this way; for example, in order to obtain two of these privileged paths, there are considered on the straight line perpendicular simultaneously to the edge 55 of the dihedron 53-54 and to the perpendicular 56 common to this edge 55 and to the edge 55' of the dihedron 59-60, two points 65 and 66 which are disposed at the same distance from the axis 56, equal to $2d\ \epsilon_1$, $d$ indicating the shortest distance between the two edges 55 and 55'; similarly, on the straight line perpendicular simultaneously to the axis 56 and the edge 55' of the dihedrons 59 and 60, there are considered two points 67 and 68 situated at the same distance from the said axis, equal to $2d\epsilon_2$. By joining the points 65 and 66 on the one hand and 67 and 68 on the other hand, in pairs, there are obtained two closed paths which are represented by full lines on FIG. 15, of which the lengths are minimum lengths, and which can consequently give a stimulated amplification effect in the tube of a gas laser inserted between the two reflecting dihedrons.

The two reflecting dihedrons of the resonator previously described can obviously be produced by other known optical arrangements, for example, by means of totally reflecting prisms.

What is claimed is:
1. An infra-red gas laser device comprising:
 (a) an elongated closed tube and means associated with said tube for forming therewith a cavity resonator for the generation of radiation, said tube having a longitudinal axis and an axial zone surrounding said axis;
 (b) a gaseous medium under low pressure contained in said tube comprising undissociated polyatomic molecules of a gaseous active substance, said polyatomic molecules having at least an upper and lower vibration-rotation energy level with invertable populations and an energy gap corresponding to an infra-red wavelength;
 (c) means for generating in said gaseous medium a continuous electric discharge homogeneously distributed along said elongated tube, said means for generating comprising at least one pair of electrode means positioned diametrically opposite on the wall of said tube and extending longitudinally along substantially the entire length of said tube, said electrodes being of small cross-sectional area as compared with the cross-sectional area of said tube cavity; and a source of high voltage connected across said pair of electrodes, the value of said voltage be- ing adjustable to generate in the axial zone of the tube optimum excitation conditions which correspond to said upper and lower vibration-rotation energy levels of said undissociated polyatomic molecules, the attaining of said optimum excitation conditions being indicated by a substantially colorless discharge in said axial zone of the tube, and further being indicated on either side of said colorless axial zone by intermediate pink colored discharge zones and by outer violet-colored discharge zones adjacent to the electrode carrying walls of the tube, whereby molecule populations of said upper and lower vibration-rotation levels of said gaseous medium are inverted and subsequent molecule transitions from the upper to the lower level produce in said cavity resonator an infra-red continuous wave stimulated emission with an efficiency of at least 5% and a power of at least 2 w. per 1 m. of the tube length.

2. An infra-red gas laser device according to claim 1 wherein said electrodes comprise a plurality of pairs of electrodes all extending all along said elongated tube and arranged on the outside of the wall of said tube in a symmetrical relationship to each other with respect to the tube axis, and wherein the source of high voltage is connected across said electrodes and comprises an adjustable high frequency electric energy generator of which the voltage and frequency are correlated in consideration of the pressure value of the gaseous medium.

3. An infra-red gas laser device according to claim 2 wherein the adjustable high frequency generator comprises a generator which produces electrical energy with a peak to peak voltage of the order of 500 volts, with a frequency comprised between 10 and 30 mc./s. and a power adjustable between 50 and 150 watts.

4. An infra-red gas laser device according to claim 1 in which the gaseous medium comprises undissociated molecules of $CO_2$.

5. An infra-red gas laser device according to claim 1 in which the gaseous medium comprises undissociated molecules of $N_2O$.

6. An infra-red gas laser device according to claim 1 in which the gaseous medium further comprises a gaseous auxiliary substance having an electrically excitable energy level near to said upper level of the undissociated molecules and selected in the group comprising nitrogen, oxygen and helium.

7. The laser device of claim 1 in which the elongated electrodes comprise electrodes distributed in a plurality of groups, and the electric energy generator comprises a same plurality of multi-phase outputs, each of which is connected to all the electrodes of a same group.

8. The laser device of claim 1, in which each of the elongated electrodes consists of a plurality of conductive sections isolated from each other and disposed from one to the other end of the elongated tube, in a row substantially parallel to the tube axis, and which comprises a same plurality of adjustable continuous-wave high frequency electric energy generators, each of which is connected to all electrode sections being substantially equally spaced from the one end of said tube.

9. The laser device of claim 1 in which each electrode consists essentially of a rectilinear conductor, disposed substantially parallel to the tube axis.

10. The laser device of claim 1 in which the electrodes consist essentially of at least one pair of similar helical conductors, wound in the same direction on the outside of the tube wall, one of said helical conductors being offset from the other by half a pitch in the direction of the tube axis.

11. The laser device of claim 1 in which each electrode consists essentially of a substantially solid cylindrical, elongated conductor.

12. The laser device of claim 1 in which each electrode consists of a metal strip deposited on the outside of the tube wall.

13. The laser device of claim 1 in which each electrode consists essentially of a metal wire braided ribbon.

14. A laser device according to claim 6 in which the gaseous medium consists essentially of $CO_2$, under a partial pressure of 0.7 millibar, atmospheric air, under a partial pressure of 1.3 millibars, and helium, under a partial pressure of 15 millibars, and the adjustable electric energy generator is adjusted to produce a continuous-wave with a frequency of about 20 mc./s., a peak-to-peak voltage of at least 500 volts, and an output power of about 50 watts.

References Cited

UNITED STATES PATENTS

| | | | |
|---|---|---|---|
| 3,149,290 | 9/1964 | Bennett et al. | 331—94.5 |
| 3,253,226 | 5/1966 | Herriott et al. | 331—94.5 X |
| 3,396,301 | 8/1968 | Kobayashi et al. | 331—94.5 X |
| 3,402,367 | 9/1968 | Kobayashi | 331—94.5 |
| 3,403,353 | 9/1968 | Lamb et al. | 331—94.5 |
| 3,404,349 | 10/1968 | Rigrod | 331—94.5 |

FOREIGN PATENTS 1,373,672   8/1964   France.

OTHER REFERENCES

RCA Tech. Notes, No. 606, March 1965.

Crocker, "Stimulated Emission . . . " Nature, v. 28, Jan. 18, 1964, pp. 250–251.

Patel et al., "Optical Maser . . . " Physical Review, v. 133, No. 5A, Mar. 2, 1964, pp. A1244–A1248.

Patel, " . . . $N_2CO_2$ Laser," App. Phys. Ltrs., v. 7, No. 1, July 1, 1965, pp. 15–17.

Howe, " . . . $CO_2$ Laser . . . " App. Phys. Ltrs., v. 7, No. 1, July 1, 1965, pp. 21–22.

RONALD L. WIBERT, Primary Examiner

W. A. SKLAR, Assistant Examiner